Sept. 4, 1956  E. A. MALICK  2,761,284
TEMPERATURE RISE REGULATOR FOR CONTINUOUS
COMBUSTION POWER PLANTS
Filed Dec. 28, 1951  3 Sheets-Sheet 1
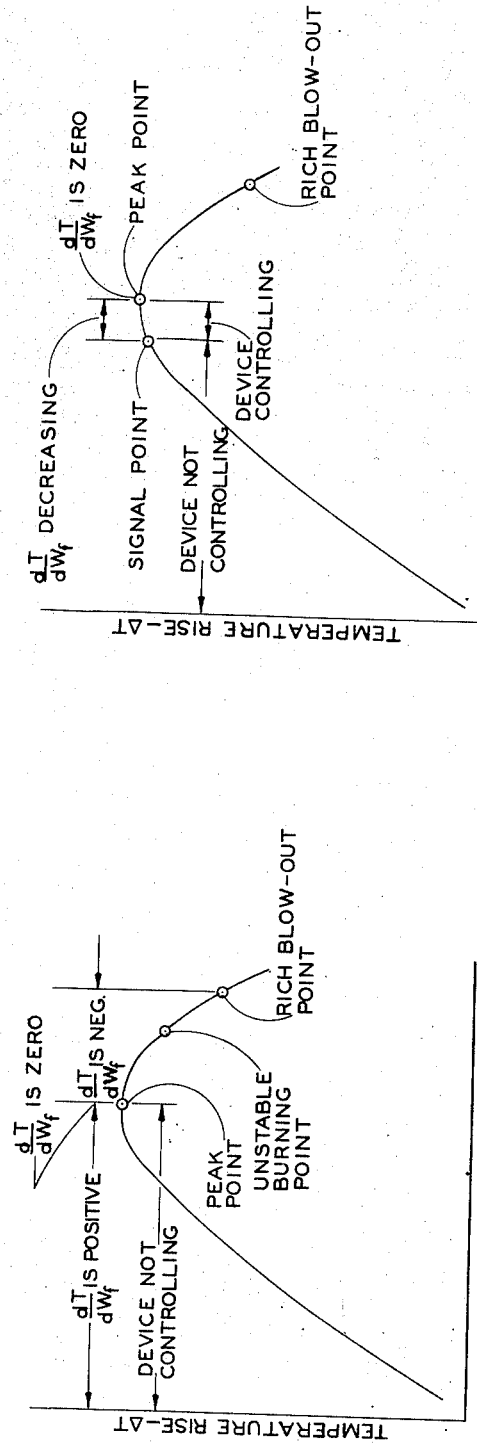
FIG. 2
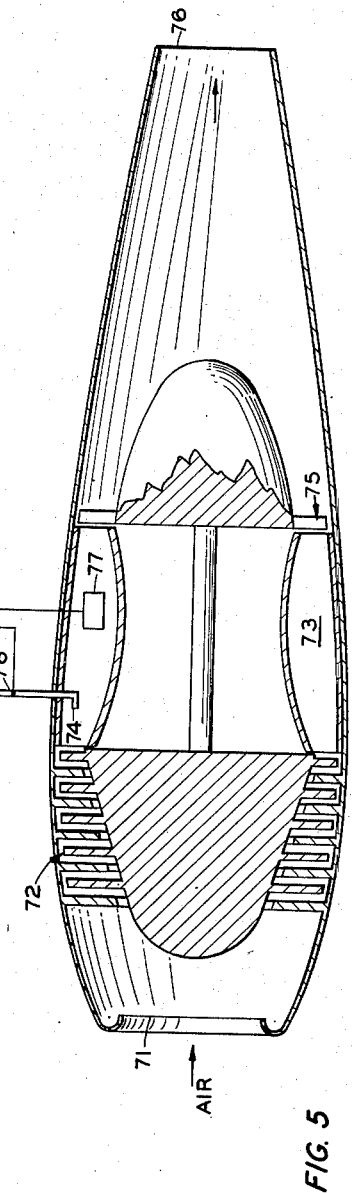
FIG. 5
INVENTOR.
EMIL A. MALICK
BY Hudson and Young
ATTORNEYS Sept. 4, 1956

E. A. MALICK 2,761,284

TEMPERATURE RISE REGULATOR FOR CONTINUOUS COMBUSTION POWER PLANTS

Filed Dec. 28, 1951

INVENTOR.
EMIL A. MALICK
BY Hudson & Young
ATTORNEYS

United States Patent Office 2,761,284
Patented Sept. 4, 1956

2,761,284

TEMPERATURE RISE REGULATOR FOR CONTINUOUS COMBUSTION POWER PLANTS

Emil A. Malick, Bartlesville, Okla., assignor to Phillips Petroleum Company, a corporation of Delaware Application December 28, 1951, Serial No. 263,934

8 Claims. (Cl. 60—39.28)

This invention relates to an apparatus for controlling the fuel flow to a continuous combustion power plant. In one aspect this invention relates to a means for preventing unstable combustion and/or rich blow-out in the combustion chamber of a continuous combustion power plant. In another aspect this invention relates to an apparatus for preventing unstable combustion and/or rich blow-out in the combustion chamber of a jet engine. In another and more specific aspect this invention relates to an apparatus which senses the magnitude or the direction of the change in the temperature of the combustion zone of a jet engine with respect to the fuel flow to the combustion chamber and prevents the supplying of fuel at a rate sufficient to cause unstable combustion or rich blow-out.

In at least one embodiment of this invention, at least one of the following objects is obtained. It is an object of this invention to provide a means for controlling the maximum allowable fuel flow to a continuous combustion power plant according to the ratio of the change in combustion zone temperature to the change in fuel flow to the combustion zone. It is another object of this invention to provide a means to prevent unstable combustion and/or rich blow-out in a continuous combustion power plant. It is another object of this invention to provide an apparatus for sensing the magnitude or the direction of the rate of change of temperature in a continuous combustion power plant with respect to the fuel flow and for preventing the supply of fuel at a rate sufficient to cause unstable combustion or rich blow-out. It is still another object of this invention to provide an apparatus for preventing unstable combustion and/or rich blow-out in the combustion chamber of a jet engine. It is still another object of this invention to utilize the relationship of combustion zone temperature rise and fuel flow in a continuous combustion power plant to prevent the rate of fuel supply from reaching the value from unstable combustion where rich blow-out occurs.

In most combustion processes in jet engines, air is passed through a combustor by either mechanical means, such as the compressor in a turbo-jet engine, or by aerodynamical means, such as the ramming effect in a ram-jet engine, and its temperature raised by the combustion of the fuel. The temperature of the combustion gases and excess air is at least partly regulated by manipulating the throttle, or similar device for varying the fuel flow to the combustor, so that the necessary combustion exit temperature required for the particular engine performance desired is obtained. During acceleration the maximum allowable fuel flow is a function of the operating conditions of the engine, such as speed and altitude, and it is therefore necessary to limit the fuel flow in order to prevent either unstable combustion or termination of combustion of the fuel-air mixture. As an example, on accelerating at a given altitude, if the fuel flow is advanced too rapidly, the fuel-air ratio in the combustion zone is increased too greatly and unstable combustion or even rich blow-out is encountered. This point at which combustion is extinguished is known as the "blow-out" or "cut-out" point.

Figures 1 and 2 show curves illustrating the relationship of combustion zone temperature rise and fuel flow in the combustion zone.

Figure 5 shows, in diagrammatic form, the invention applied to a jet engine.

Figure 3:
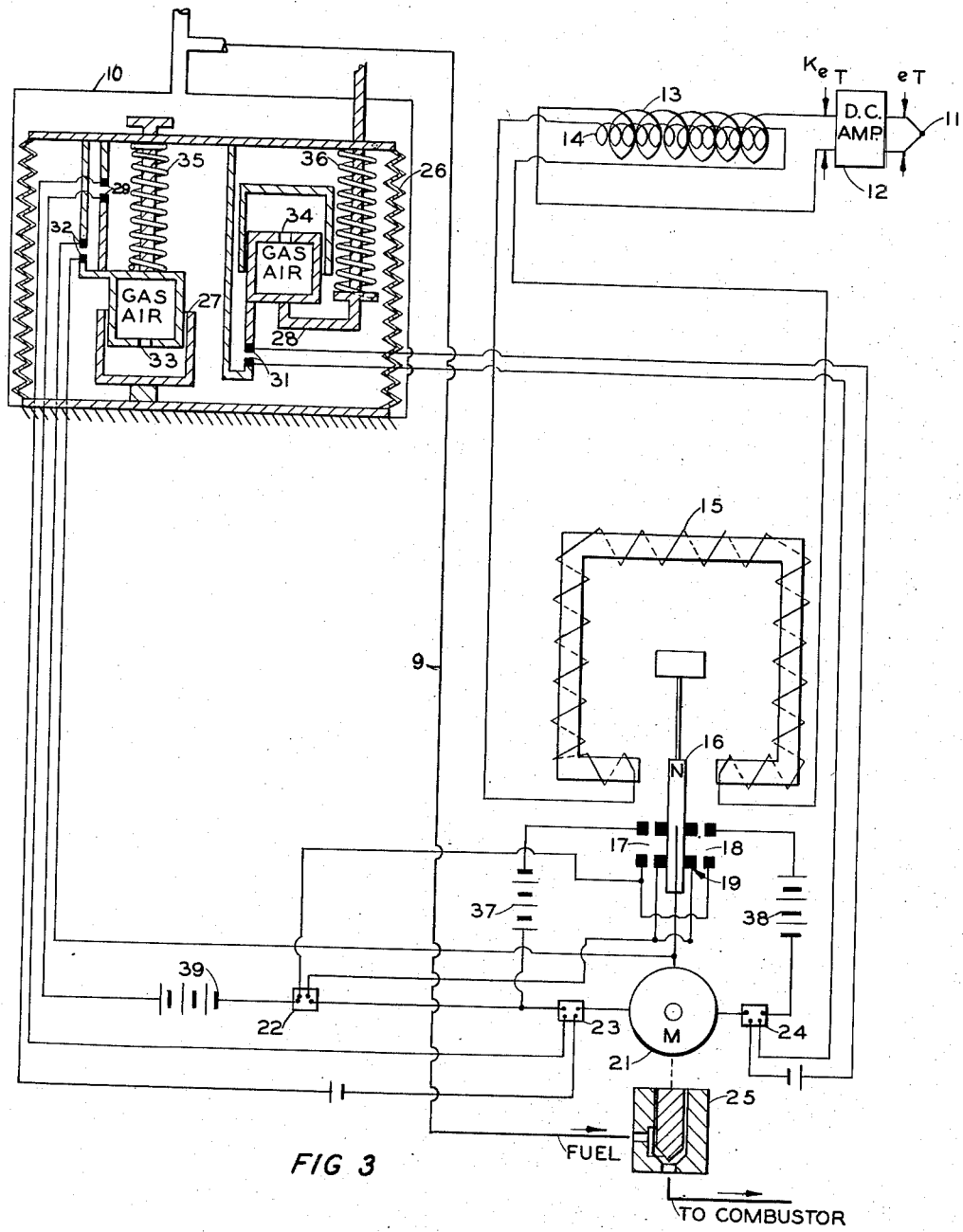
Figure 3 shows, in diagrammatic form, a system which senses the direction of $dT/dW_f$, the rate of change of temperature with respect to fuel flow.

In a continuous flow combustion process there is a relationship between combustor temperature rise and fuel-air ratio as shown in Figures 1 and 2. The relationships shown change with different operating conditions such as speed and altitudes and may be expressed as the rate of change in temperature rise ($dT$) to the change in fuel flow ($dW_f$). As the fuel flow increases from an operating position on the left of the point marked "peak point," there is a corresponding increase in the combustor temperature until this maximum or peak point is reached. This peak point represents that fuel flow which corresponds to the maximum combustor temperature rise attainable under the particular operating conditions of the engine. As the peak point is closely approached from the left, during an increase in fuel flow, the rate of change of temperature rise with respect to fuel flow ($dT/dW_f$) decreases until the peak point is reached; that is, the slope of the curve is positive and decreases to zero value at the peak point. Upon reaching zero slope, as fuel flow is further increased and the peak point is passed, there is a drop in temperature as shown. Hence, the slope of the curve becomes negative. At some point in this region to the right of the peak point, combustion becomes unstable, shown in Figure 1 as "unstable burning point," and if fuel flow is increased still further, the combustion instability heightens until a point is reached where there is complete cessation of combustion, identified in Figures 1 and 2 as the "rich blow-out point."

In another type of curve derived from the performance of certain types of engines, $dT/dW_f$ is always positive and the "peak point" coincides with the "blow-out point." In this case, slope does not necessarily reach zero.

The curves of Figures 1 and 2 represent what is called a "steady state" curve for a particular engine. Under a particular set of values of operating variables (e. g., pressure, inlet air temperature, etc.), which define the operating condition, such a curve describes the variation in temperature rise of the engine with fuel flow when the fuel flow is varied reversibly, in a thermodynamic sense. Each point on the curve represents, for that particular fuel flow, the temperature rise when equilibrium has been reached for that particular set of operating variables. Since acceleration (or deceleration) is a nonequilibrium state, the steady state curve does not necessarily apply at such time; rather, temperature rise varies with fuel flow along a "non-steady state" or "transient" curve during acceleration (or deceleration), which curve may, however, have a shape similar to that of the steady state curve. Operation along a transient curve may result from a change in any one or more of the variables affecting engine operation. Furthermore, transient condition may be initiated with origins at any point of the range covered by the steady state curve. For example, an engine can be operating under steady state conditions represented by a point on the left side of the peak of the steady state curve. At this time, one of the variables affecting engine operation is changed, such change may result in engine operation as defined by a transient curve, and, furthermore, the peak point of this transient curve may be reached or passed.

Since the present invention applies equally to engines operating in both steady and non-steady states, and is particularly applicable to engines operating under accelerative conditions, the discussion herein, and particularly that which refers to Figures 1 and 2, is not to be construed as being limited to steady state conditions. Therefore, the relationship $dT/dW_f$ is to be regarded as referring to the slope of either the steady state curve or a transient curve depending on whether engine operation is in the steady or non-steady state.

I have discovered a means for controlling fuel flow whereby combustion instability and rich mixture blowout are prevented. One means of automatically effecting this control of fuel flow utilizes a device which senses the direction of the rate of change of combustor temperature with respect to fuel flow, or $dT/dW_f$, and therefore operates at the peak point or at a point just to the right of the peak point (Figure 1), where the value of $dT/dW_f$ is just beginning to increase as a negative value. When $dT/dW_f$ is positive in sign, this device is not controlling. When $dT/dW_f$ is negative in value, or as soon as it becomes negative, corresponding to a decrease in combustor temperature as fuel flow is increasing, the device operates to reduce fuel flow until $dT/dW_f$ becomes zero, or the peak point is reached. At this time the device again ceases controlling the fuel flow, since it will have established the peak condition and avoided operation in the undesirable range where combustion is unstable. When the demand of the operator is to reduce fuel flow, the device is not controlling and deceleration may be readily accomplished. This means of control cannot be employed with an engine whose performance curve is such that $dT/dW_f$ is always positive.

Another means of automatically effecting this control of fuel flow utilizes a device which senses the magnitude of the rate of change of combustor temperature with respect to fuel flow, or $dT/dW_f$. This means of control can be employed with any jet engine because it operates when $dT/dW_f$ is positive. Referring to the attached Figure 2, as fuel flow is increased up to the point indicated as "signal point," this device is non-controlling and permits operation in the usual manner. When the value of $dT/dW_f$ or the slope of the curve decreases to this signal point value, the device begins controlling and reduces the rate of change of fuel flow so that the peak point is approached more and more slowly as the value of $dT/dW_f$ approaches more closely to zero. The location of this signal point on the curve is as close to the peak point as possible and is determined by characteristics of the fuel and by the time delay necessary for the device to sense that a change in $dT/dW_f$ has occurred and make the corresponding change in the rate of fuel flow. As the fuel flow increases between the signal point and the peak point, or as the slope decreases below that existing at the signal point, the device acts further to reduce the rate of change in fuel flow. This gradual reduction in fuel flow increase continues until some point is reached at which time the device acts to prevent any further increase.

In the means which senses the direction of rate of change of $dT/dW_f$, the device operates just as the peak point is passed. Although on the first means operating conditions are nearer the region of unstable combustion than in the second means, the difference is so small as not to affect the overall usefulness of the regulatory device. Fuel consumption is, however, slightly higher using the first means because the rate of fuel flow must advance to a position past the peak point before the device becomes controlling.

Referring now to Figure 3, the output of the thermocouple 11 is a voltage $e_T$, proportional to the temperature in the combustor. Under almost all operating conditions the variation in inlet temperature with respect to combustor temperature is so small that it can be ignored, therefore a measure of the temperature rise in the combustor can be employed as representative of the temperature rise across the combustor. This voltage is amplified in the direct current amplifier 12 to a proportionate voltage $ke_T$. Outer coil 13 is energized by this voltage and inner coil 14 is energized by induction whenever there is a change in the magnitude of $ke_T$ due to a change in temperature in the combustor (not shown). The magnitude and direction of the induced voltage depend on whether the temperature rises or falls. Electromagnet 15 is energized by the induced voltage, the polarity depending on the direction of this voltage. When the electromagnet 15 is energized, permanent magnet 16 is moved to one side or another to close contacts 17 or 18 of switch 19. Switch 19 conveniently can be a double-pole, double-throw switch as shown. Closure of these contacts permits power to be supplied to the power circuits of the motor 21. Determination of which power circuit, if any, is energized is dependent on the positions of solenoid switches 22, 23, and 24. Depending on which power circuit is energized, the motor 21 opens or closes auxiliary valve 25. This regulatory valve may be either placed in combination with another valve as a by-pass valve, or so constructed that complete stoppage of fuel is not affected when the valve is fully closed.

Solenoid switches 23 and 24 are controlled by means of the bellows-dashpot combination of the pressure-determining device. This device detects the fuel pressure in the fuel line 9 to the engine at some point before the regulatory valve 25. The bellows device 26 is enclosed in a housing 10 so that the pressure of the fuel in the fuel line 9 is exerted upon the top of the bellows. During a period of increasing fuel flow, the fuel pressure increases and causes the top of bellows 26 to move in toward the dashpots 27 and 28. This movement causes closure of contacts 29 which, in turn, causes normally open solenoid switch 23 to close. Similarly, decreasing fuel pressure causes closure of contacts 31 which, in turn, causes normally closed solenoid switch 24 to open. Closure of contacts 32, to furnish power to the power circuit, occurs simultaneously with that of contacts 29. Dashpots 27 and 28 prevent closure of contacts 29, 31 and 32 from continuing for long after the movement of the bellows 26 ceases. The duration of the time lag between the cessation of bellows movement and the opening of the contacts 29, 31, and 32 depends on the size of the orifices 33 and 34 in the dashpot cylinders and on the characteristics of the springs 35 and 36.

The position of normally closed solenoid switch 22 is controlled by contacts 17 and 18 of switch 19. Closure of either contacts 17 or 18 results in the opening of switch 22.

Numbers 37, 38 and 39 represent batteries or other source of electrical energy.

The operation of this device will first be considered during a period of increasing fuel flow, during which time contacts 29 and 32 are closed. Normally open solenoid switch 23 is closed by the closing of contacts 29. If the temperature is increasing, contacts 18 of switch 19 are closed, normally closed switch 22 is opened, normally closed switch 24 is still closed, and power is supplied to motor 21 through switch 24 to open valve 25. The fuel flow continues to increase until the peak point of the curve (Figure 1) is reached. At this time the temperature decreases and contacts 17 of switch 19 are closed, normally closed switch 22 is still open, closed contacts 18 of switch 19 are now opened, normally open switch 23 is still closed and power is supplied through switch 23 to motor 21 which closes valve 25 causing a decrease in fuel flow. This results in a temperature rise and repetition of the cycle. The device is in a state of control as long as increasing fuel flow causes a closure of contacts 29 and 32. When the fuel flow reaches a steady rate, the combination of dashpots and springs causes contacts 29 and 32 to open and closure of valve 25 can no longer occur. However, if the temperature continues to increase, valve 25 is opened by the closing of contacts 18 of switch 19. The opening of valve 25 will either continue until it is completely open or cease to open at an intermediate position when the temperature stops rising.

In a period of decreasing fuel flow, the fuel pressure is decreasing and contacts 29 and 32 are open and contacts 31 are closed. Normally open solenoid switch 23 remains open and normally closed solenoid switch 24 is opened, consequently valve 25 remains in an open position and the device is not controlling. The fuel flow is now determined solely by the position of the throttle lever.

In a period of increasing fuel flow, the fuel pressure causes contacts 29 and 32 to close, closure of contacts 29 causes normally open switch 23 to close. By this sequence, valve 25 is opened instantaneously without regard to the combustor temperature and thus permits the temperature element to have its effect on the control of the valve by the action of contacts 17 or 18 of switch 19. This sequence of operation also prevents starting a period of acceleration against a closed or partially closed valve 25.

Figure 4:
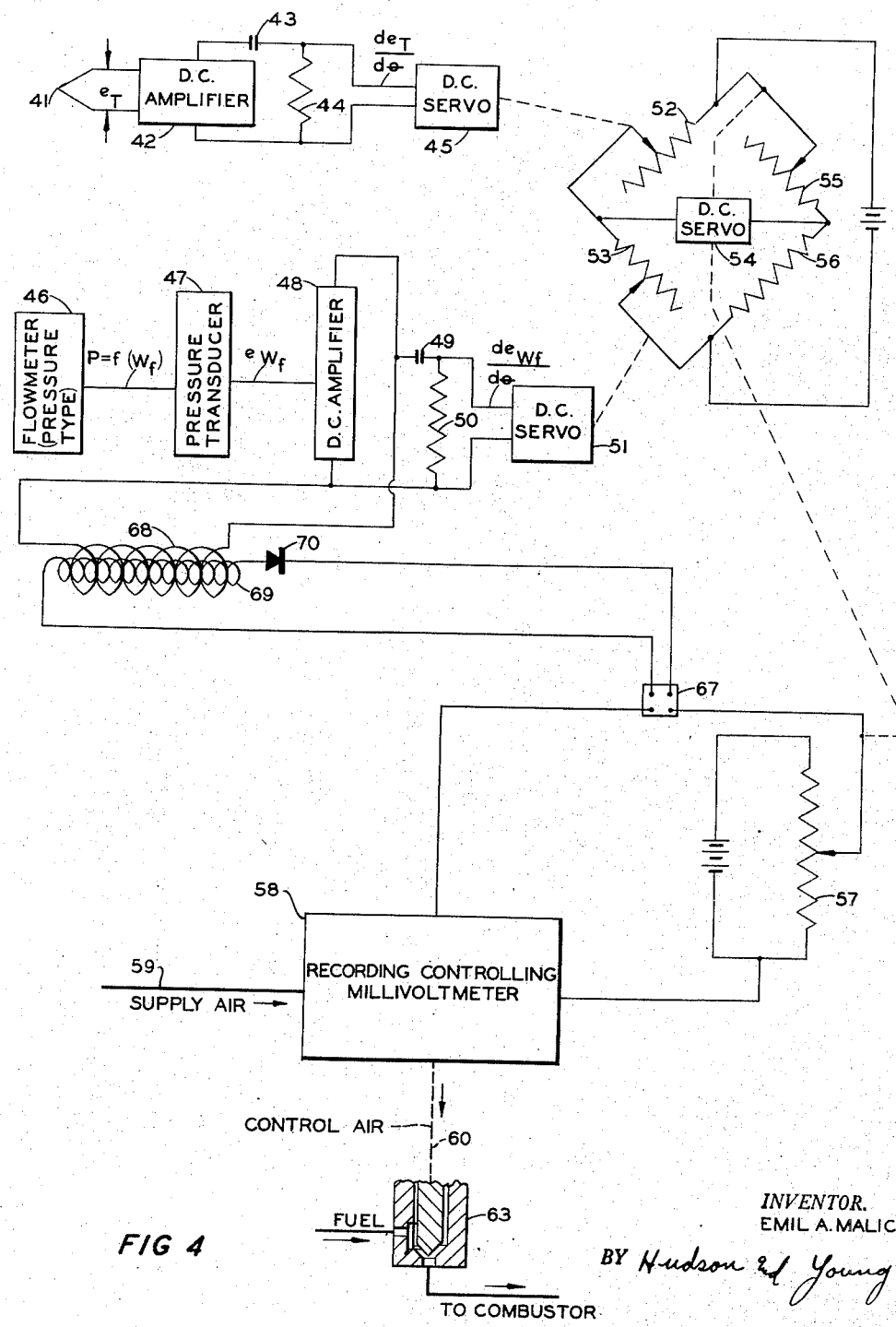
Figure 4 shows, in diagrammatic form, a system which senses the magnitude of $dT/dW_f$.

In Figure 4 is shown a specific embodiment for an electrical device for sensing the magnitude of the rate of change of $dT/dW_f$. A voltage from the thermocouple 41 proportional to the combustor temperature is amplified in direct current amplifier 42 and applied across a condenser 43 and resistor 44 in series. The voltage drop across resistor 44, proportional to the derivative of the temperature with respect to time, $dT/d\theta$, is applied to direct current servo 45. Similarly, a voltage proportional to the time derivative of the fuel flow, $dW_f/d\theta$, is obtained from a voltage proportional to the fuel pressure and applied to the direct current servo 51. A pressure type flowmeter 46 and a pressure transducer 47 develop this voltage which is proportional to the fuel pressure.

The pressure transducer, referred to herein, is a device for electrically measuring mechanical motions and transmitting such measurements in the form of an electrical signal. When an alternating current is transmitted, the device is essentially a differential transformer with a linear response. Such a device is described in "Principles and Methods of Telemetering" by Perry A. Borden, Reinhold Publishing Corporation, New York (1948), at page 160 et seq. A similar device is described in U. S. Patent No. 2,568,587 (1952) to W. D. Macgeorge. When direct current is to be transmitted, a device is used which utilizes the principle of the Wheatstone bridge. A device of this nature is described in the above-mentioned "Principles and Methods of Telemetering" at page 56 et seq. and illustrated in Figure 22 on page 55. Such devices are known to the art and are available in a variety of forms.

These two direct current servos control two adjacent arms 52 and 53 of the bridge circuit. The bridge servo 54 balances the bridge by varying the resistance of arm 55 of the bridge. When balance is achieved, the resistance of arm 55 and, therefore, the rotation of the servomotor is proportional to $$\frac{ZdT/d\theta}{dW_f/d\theta} \text{ or } ZdT/dW_f$$

where "Z" is the value of the resistance of the fourth arm 56 of the bridge circuit. The mechanical output of the bridge servo 54 is connected to the movable arm of the non-linear potentiometer 57, the output of which is a voltage $e_D$, non-linearly related to $dT/dW_f$. This voltage is applied to a recording and controlling millivoltmeter 58. Controlling millivoltmeters suitable for incorporation into this device are available. The controlling millivoltmeter supplies air to open and close air operated motor valve 63 in response to the signal received from the potentiometer 57. A quicker response can be obtained employing an electrically actuated fuel valve. One means which can be employed is shown and described in "The Electronic Control Handbook" by R. R. Batcher et al., Caldwell-Clements, Inc. New York, 1946, on page 240.

Because it is desirable that the valve open quickly when fuel flow is increasing along the lower portion of the curve and that it close comparatively slowly when fuel flow is increasing along that portion of the curve past the signal point, the potentiometer 57 is wound non-linearly in such manner (for example, logarithmically) that the value of $e_D$ is high when operation is along the lower portion of the curve, but decreases rapidly, at first, and then more slowly as the peak point is approached. The form of the potentiometer winding will depend on the response characteristics desired which, in turn, will depend on the engine design.

It may be desirable that this system operate only on fuel flow increase; therefore, a normally open solenoid switch 67, has been placed as shown in Figure 4. A voltage from the D. C. amplifier 48 proportional to the fuel flow is fed to the primary coil 68 so that whenever fuel flow is changing an induced voltage is developed in secondary coil 69. This induced voltage is fed to a diode rectifier 70 which permits current to flow only when the direction of the induced current corresponds to an increase in fuel flow. This current causes switch 67 to close and valve 63 to open.

In Figure 5 is shown, in diagrammatic form, the present invention as applied to a jet engine. Air is taken into the engine at 71, is compressed by the compressor 72 and passes to the combustion chamber 73 where it is expanded by combustion of fuel admitted through nozzle 74. The combustion products pass through turbine 75 and are discharged from the engine at 76. Combustion chamber temperature is determined by thermocouple 77 and fuel flow rate is determined by pressure sensitive device 78 and these values are transmitted to signal converter 79 which can be the device of either Figure 3 or Figure 4. Signal converter 79 operates as hereinbefore described to close motor valve 81 when $dT/dW_f$ approaches or reaches the value set as the control point, thus reducing the flow of fuel from fuel tank 82 to combustion chamber 73.

Reasonable variations and modifications are possible within the scope of the foregoing disclosure to the present invention the essence of which is a means for preventing unstable combustion and/or rich blow-out in a continuous combustion power plant by limiting the fuel flow to the combustion zone when the relationship of rate of combustion zone temperature change with respect to fuel flow to the combustion zone reaches or approaches a predetermined value.

I claim:

1. An apparatus for preventing unstable combustion in a continuous combustion power plant wherein a motive fluid is expanded in a combustion zone by combustion of fuel therein which comprises in combination, means for sensing temperature in the combustion zone and converting rate of change of said temperature into a signal; means for sensing flow of the fuel in the fuel line to said combustion zone and converting change in fuel flow in said fuel line into a signal; means for receiving and comparing said signals; a flow control means in the fuel line to said combustion zone and means operatively connected to said comparing means and to said flow control means in said fuel line so as to reduce the fuel flow to said combustion zone when a predetermined relationship is attained between fuel flow and rate of change of temperature in said combustion zone.

2. The apparatus of claim 1 wherein the fuel flow reducing valve is actuated when the rate of combustion zone temperature rise with respect to fuel flow is less than zero.

3. The apparatus of claim 1 wherein the fuel flow reducing valve is responsive to a predetermined rate of combustion zone temperature rise with respect to fuel flow, the response increasing as the value of this relationship approaches zero.

4. An apparatus for controlling the rate of fuel flow to a continuous combustion power plant wherein a motive fluid is expanded in a combustion zone by combustion of fuel therein which comprises in combination, a temperature sensing means responsive to the rate of change of the temperature of said combustion zone, a fuel flow sensing means responsive to the flow of the fuel in the flow line to said combustion zone, a fuel flow and temperature comparing means, a flow control means operatively connected with said temperature change sensing means and with said fuel flow sensing means through said comparing means so that the fuel flow to the combustion zone is reduced to a predetermined value when the rate of change of combustion zone temperature with respect to fuel flow reaches a predetermined value.

5. An apparatus for controlling the fuel flow to a continuous combustion power plant wherein a motive fluid is expanded in a combustion zone by combustion of fuel therein which comprises in combination; a thermocouple in said combustion zone operatively connected to a direct current amplifier and a first coil; a second coil receiving current by induction from said first coil; an electromagnet operatively connected to said second coil, a permanent magnet movably secured in the magnetic field of said electromagnet; switches operatively connected to said electromagnet so that one switch is closed when the temperature of the thermocouple is rising and current is flowing through the electromagnet and the other switch is closed when the temperature of the thermocouple is falling and the current is flowing through the electromagnet in the opposite direction; said switches being connected through a source of electrical energy and through solenoid switches hereinafter set forth, to a reversible motor; solenoid switches in the energy lines to said motor; a valve in a fuel line to said combustion zone operatively connected to said motor; a liquid-tight bellows in said fuel line containing spring and dash-pot switches operatively connected to said bellows so as to operate said solenoid switches hereinbefore referred to so that electrical energy can be supplied to said motor during a period of increasing flow through said fuel line and energy is prevented from being supplied to said motor during a period of constant or decreasing flow through said fuel line.

6. An apparatus for controlling the fuel flow to a continuous combustion power plant wherein a motive fluid is expanded in a combustion zone by combustion of fuel therein which comprises in combination; a thermocouple in said combustion zone operatively connected through a first condenser-resistor network circuit and a direct current servomotor to a first arm of a bridge circuit; a pressure flow meter in a fuel line to said combustion zone operatively connected through a pressure transducer, a second condenser-resistor network circuit and a direct current servomotor to a second arm of said bridge circuit; a bridge balancing direct current servomotor operatively connected to a third arm of said bridge and to a movable arm of a non-linear potentiometer; said potentiometer operatively connected to a controlling millivoltmeter which supplies air to an air operated motor-valve in said fuel flow line to said combustion zone; a first coil operatively connected to said differentiating circuit connected to said pressure flow meter; a second coil receiving current by induction from said first coil and operatively connected through a diode rectifier to a normally open solenoid switch so that said solenoid switch is closed only when the pressure in said fuel line is increasing.

7. An apparatus for controlling the fuel flow to a continuous combustion power plant wherein a motive fluid is expanded in a combustion zone by combustion of fuel therein which comprises in combination; a thermocouple in said combustion zone operatively connected through a first condenser-resistor network circuit and a direct current servomotor to a first arm of a bridge circuit; a pressure flow meter in a fuel line to said combustion zone operatively connected through a pressure transducer, a second condenser-resistor network circuit and a direct current servomotor to a second arm of said bridge circuit; a bridge balancing direct current servomotor operatively connected to a third arm of said bridge and to a movable arm of a non-linear potentiometer; said potentiometer operatively connected to a controlling millivoltmeter which supplies air to an air operated motor-valve in said fuel flow line to said combustion zone.

8. The apparatus of claim 1 wherein said means for sensing temperature in the combustion zone and converting rate of change of said temperature into a signal comprises a thermocouple in said combustion zone operatively connected through a direct current amplifier to a first coil, and a second coil positioned so that current from said first coil is induced in said second coil; said means for sensing flow of the fuel in the fuel line to said combustion zone and converting change in fuel flow in said fuel line into a signal comprises a liquid-tight bellows in said fuel line operatively connected through spring and dash-pot switches to a circuit including a source of potential; and said means for receiving and comparing said signals comprise an electromagnet operatively connected to said second coil, a permanent magnet movably secured in the magnetic field of said electromagnet, a double-pole, double-throw switch operatively connected to said electromagnet so that one switch is closed when the temperature of the thermocouple is rising and current is flowing through the electromagnet and the other switch is closed when the temperature of the thermocouple is falling and the current is flowing through the electromagnet in the opposite direction, and solenoid switches operatively connected to said double-pole, double-throw switch and to said circuit including said source of potential.

References Cited in the file of this patent
UNITED STATES PATENTS

| | | |
|---|---|---|
| 2,404,428 | Bradbury | July 23, 1946 |
| 2,488,221 | Moore | Nov. 15, 1949 |
| 2,521,244 | Moore | Sept. 5, 1950 |
| 2,564,107 | Holley | Aug. 14, 1951 |
| 2,581,275 | Mock | Jan. 1, 1952 |
| 2,606,420 | Moore | Aug. 12, 1952 |